R. F. M. FLACK.

Improvement in Stalk-Cutters.

No. 130,204.  Patented Aug. 6, 1872.

UNITED STATES PATENT OFFICE.

ROBERT F. M. FLACK, OF COLUMBUS CITY, IOWA.

IMPROVEMENT IN STALK-CUTTERS.

Specification forming part of Letters Patent No. 130,204, dated August 6, 1872.

Specification describing a new and Improved Corn-Stalk Cutter, invented by ROBERT F. M. FLACK, of Columbus City, in the county of Louisa and State of Iowa.

My invention is an improvement in the class of rotary stalk-cutters; and consists in the manner of arranging the frame, cutter-wheel, and hoisting device, so that when the wheel is out of action the frame in which the same is mounted may be elevated, whereby the hoisting-rope may be relieved of strain and certain other advantageous results secured.

Figure 1:
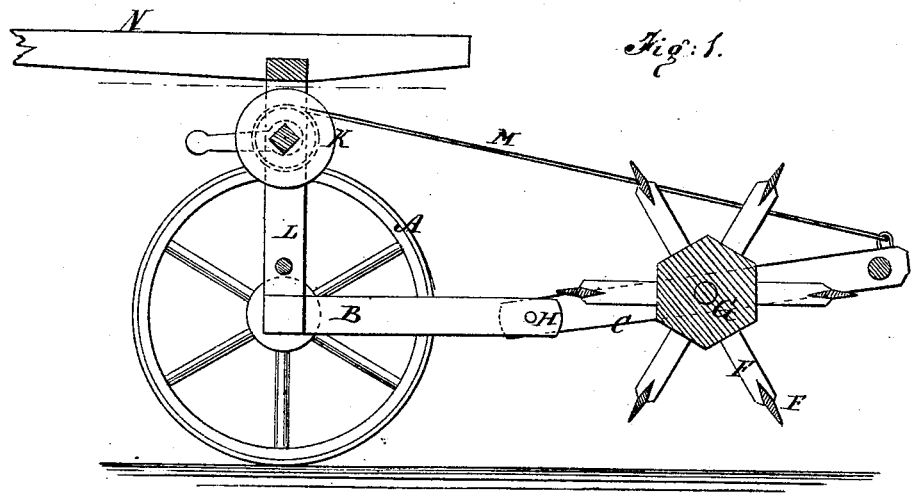
Figure 2:
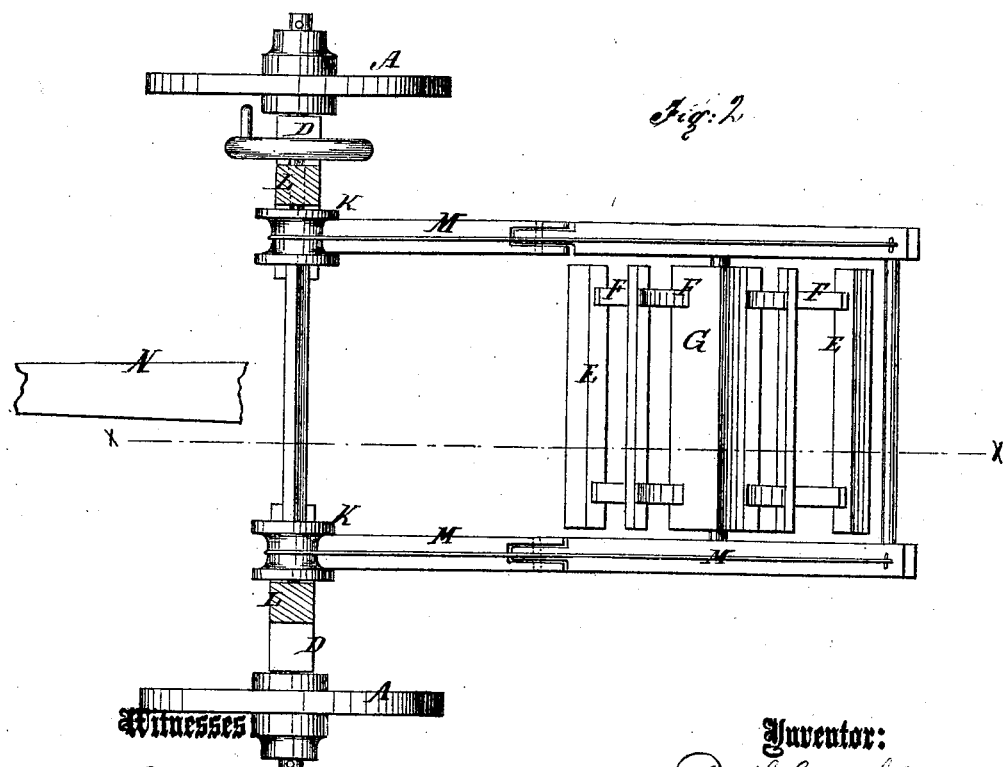

In the accompanying drawing, Figure 1 is a longitudinal sectional elevation of my improved machine taken on the line $x\ x$ of Fig. 2, and Fig. 2 is a plan view of the machine.

Similar letters of reference indicate corresponding parts.

A represents the truck-frame; B and C, the frame, projecting forward of the axle D to support the cutters E, which are mounted in the ends of arms F projecting from the shaft G, which is mounted horizontally in the front end of the part C of said frame, which is jointed to B at H, the said cutters being parallel with the axle, and adapted to roll along against the stalks and press them down and cut them into short sections as the machine is moved along, so as to force them against the stalks, whether standing or pressed over upon the ground. K is the windlass, mounted on the uprights L rising up from the axle. M represents the cords connecting the front end of frame C with said windlass, for raising the cutters off the ground when they are not required to act. N represents the tongue, by which the horses are attached behind the axle, for pushing the cutting-wheel along over the stalks. Said tongue will preferably be jointed, to allow the necessary vibration relatively with the axle, to work over uneven ground. When the wheel is not in action it is raised by means of the windlass and cord, and the outer ends of the bars C are allowed to rest on the windlass-shaft. In this position no strain is brought on the rope, and the machine is in the most safe and compact form for transportation, or storage, or for rapid movement to and from the field.

The cutters are double-edged, and they are fitted in slots in the ends of the arms and secured by bolts in such manner that they may be taken off and reversed readily when one edge has become dull.

Having thus described my invention, I claim as new and desire to secure by Letters Patent—

The frame C, provided with stalk-cutter F G, and jointed to the outer end of and transferable upon the truck-frame B, as and for the purpose described.

ROBERT F. M. FLACK.

Witnesses:
GEO. W. JAMES,
WESLEY W. GARNER.